United States Patent [19]
Martins

[11] 3,837,437
[45] Sept. 24, 1974

[54] RATCHET ACTUATED BRAKE WEAR COMPENSATION
[75] Inventor: Samuel J. Martins, Reseda, Calif.
[73] Assignee: Airheart Products, Inc., Chatsworth, Calif.
[22] Filed: Jan. 22, 1973
[21] Appl. No.: 325,898

[52] U.S. Cl. ............................................. 188/71.8
[51] Int. Cl. .......................................... F16d 55/02
[58] Field of Search ....... 188/71.8, 71.9, 72.6, 72.9, 188/79.5 K, 196 B, 196 A, 196 BA, 72.5

[56] References Cited
UNITED STATES PATENTS

| | | | |
|---|---|---|---|
| 1,554,573 | 9/1925 | Griffith | 188/72.9 |
| 2,274,213 | 2/1942 | Pratt | 188/72.6 |
| 2,669,327 | 2/1954 | Chamberlain | 188/72.9 |
| 3,121,478 | 2/1964 | Bostwick | 188/79.5 K |
| 3,269,490 | 8/1966 | Swift | 188/71.9 |
| 3,323,618 | 6/1967 | Riddy | 188/196 BA |
| 3,371,755 | 3/1968 | Leeper | 188/79.5 K |
| 3,702,125 | 11/1972 | Jeffries | 188/72.9 |
| 3,724,607 | 4/1973 | Reinecke | 188/79.5 K |
| 3,727,728 | 4/1973 | Bostwick | 188/79.5 K |

*Primary Examiner*—Robert J. Spar
*Assistant Examiner*—Gary L. Auton
*Attorney, Agent, or Firm*—William W. Haefliger

[57] ABSTRACT

A pneumatically actuated brake system employs a lever, and means responsive to lever swinging to receive primary force transmission via one portion of the lever for effecting advancement of a brake part into braking engagement with a moving part such as a disc, and to receive auxiliary force transmission from another portion of the lever to displace the brake part toward the disc in compensating relation to the degree of brake part wear, whereby the range of lever swinging may be quite limited.

14 Claims, 14 Drawing Figures

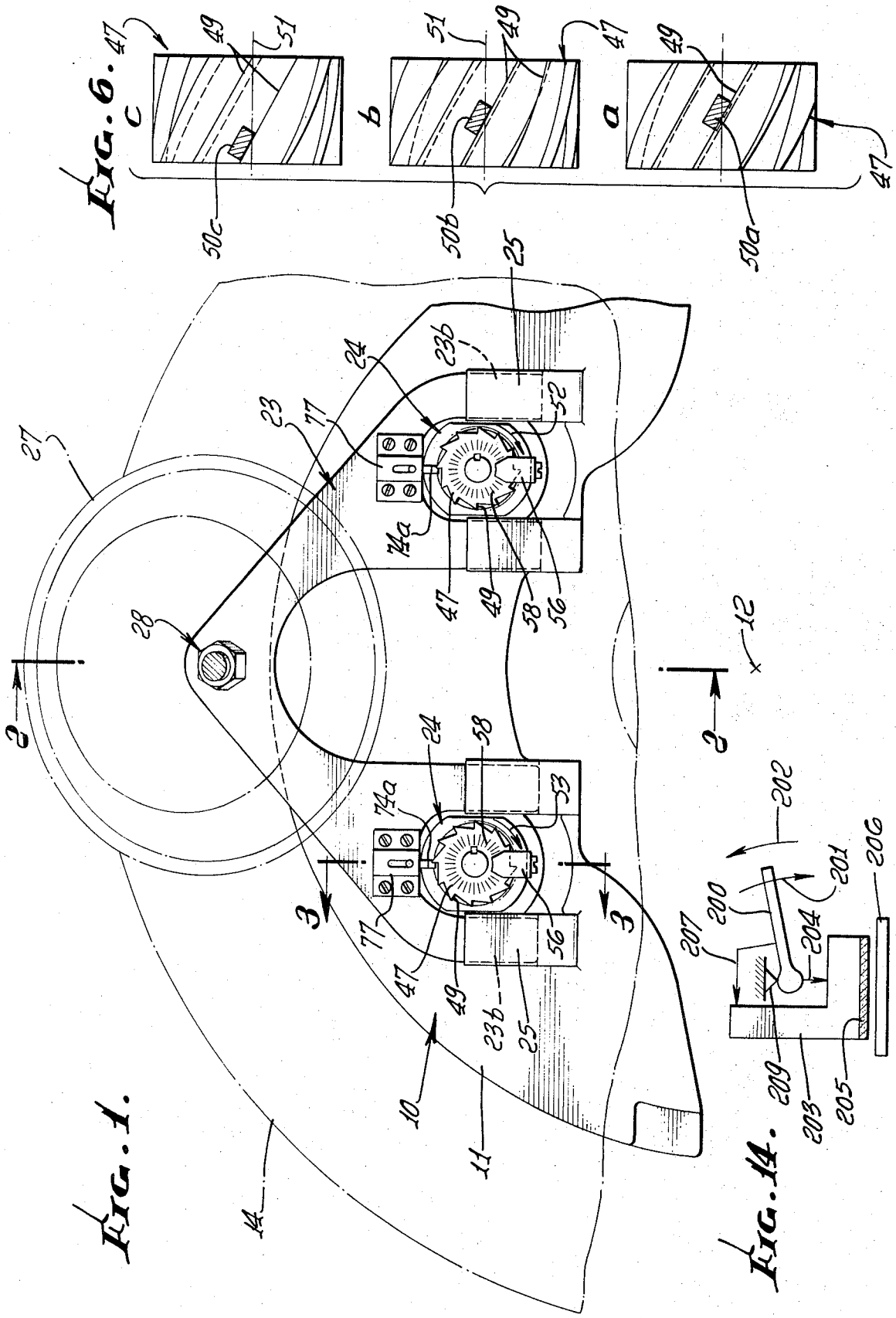

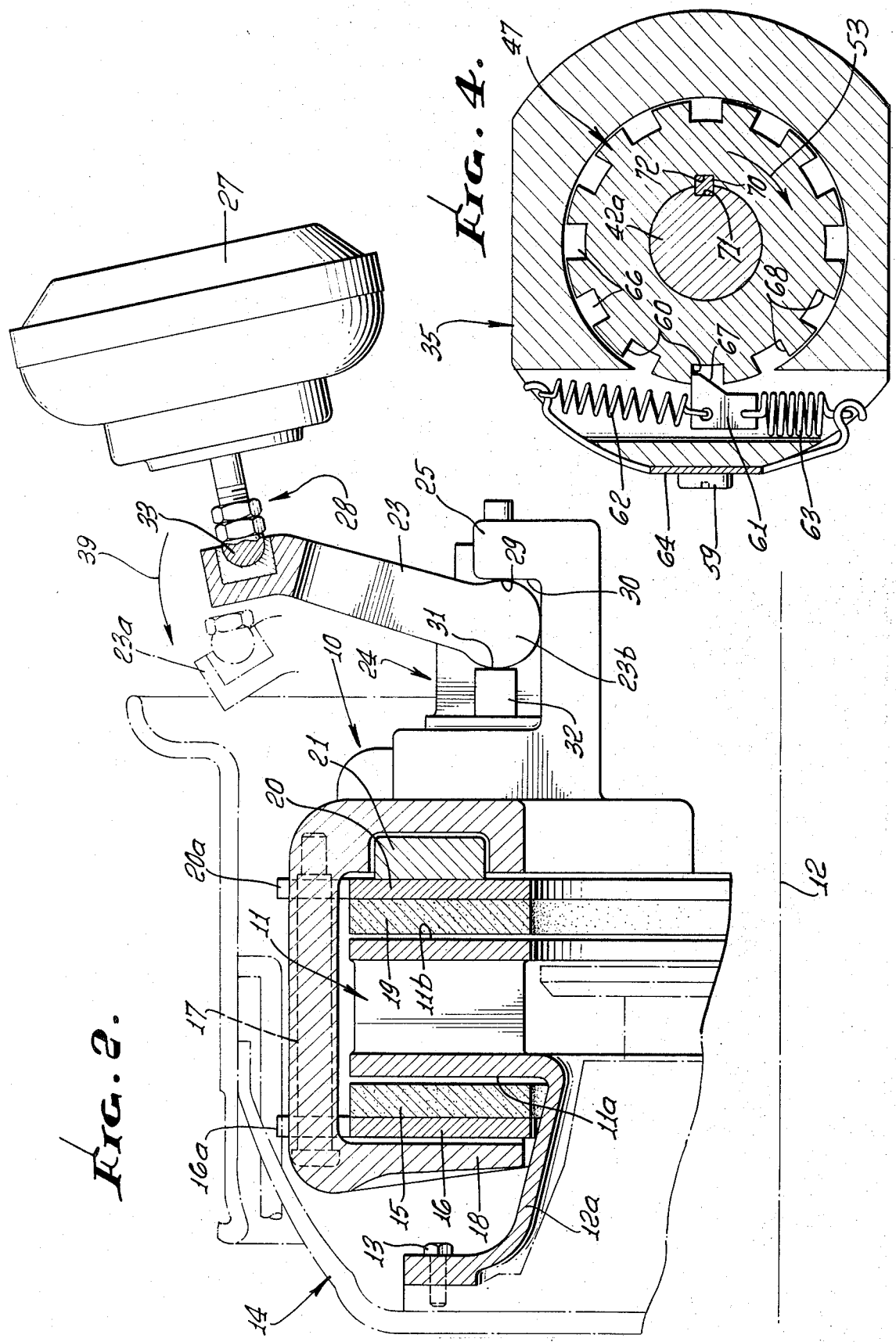

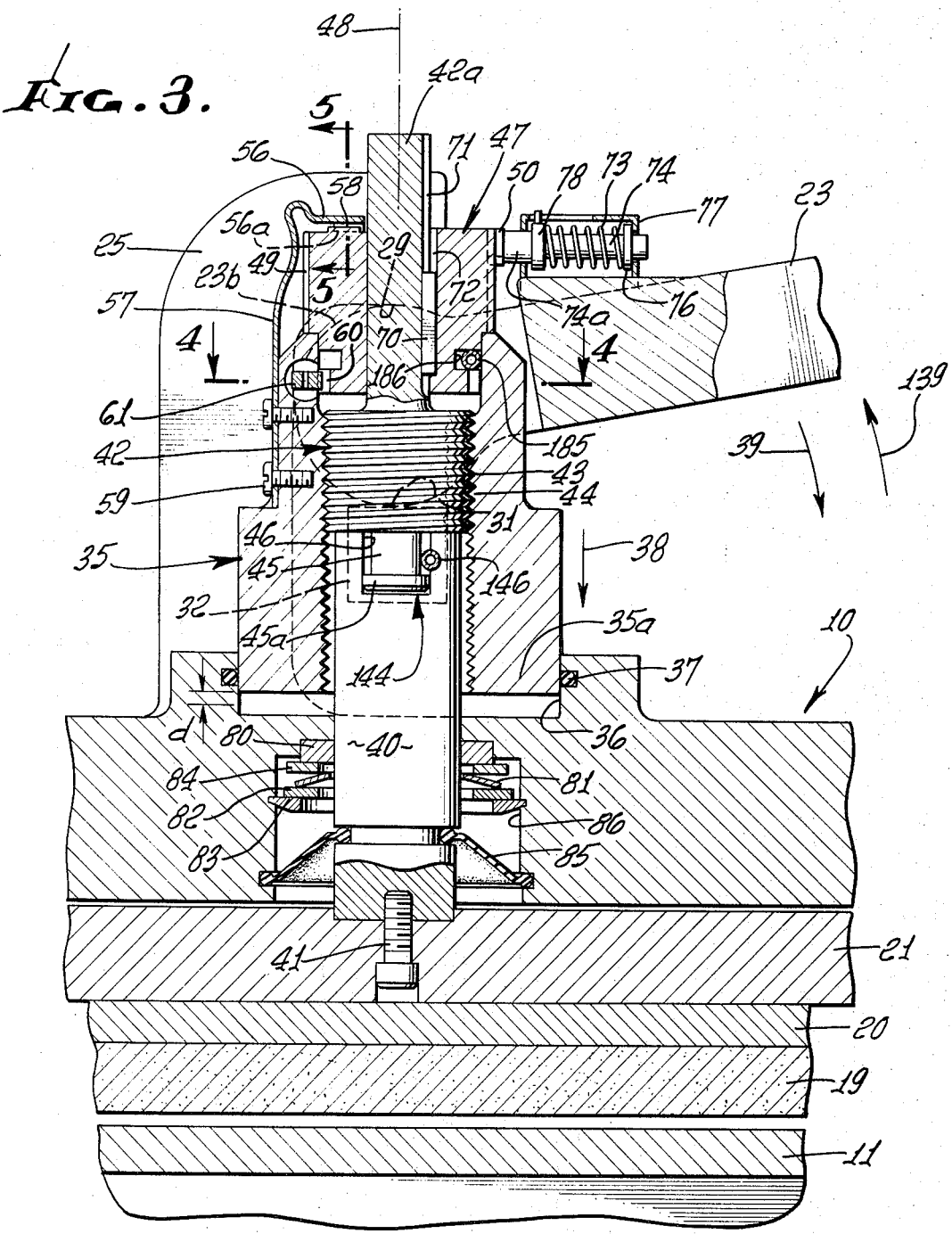

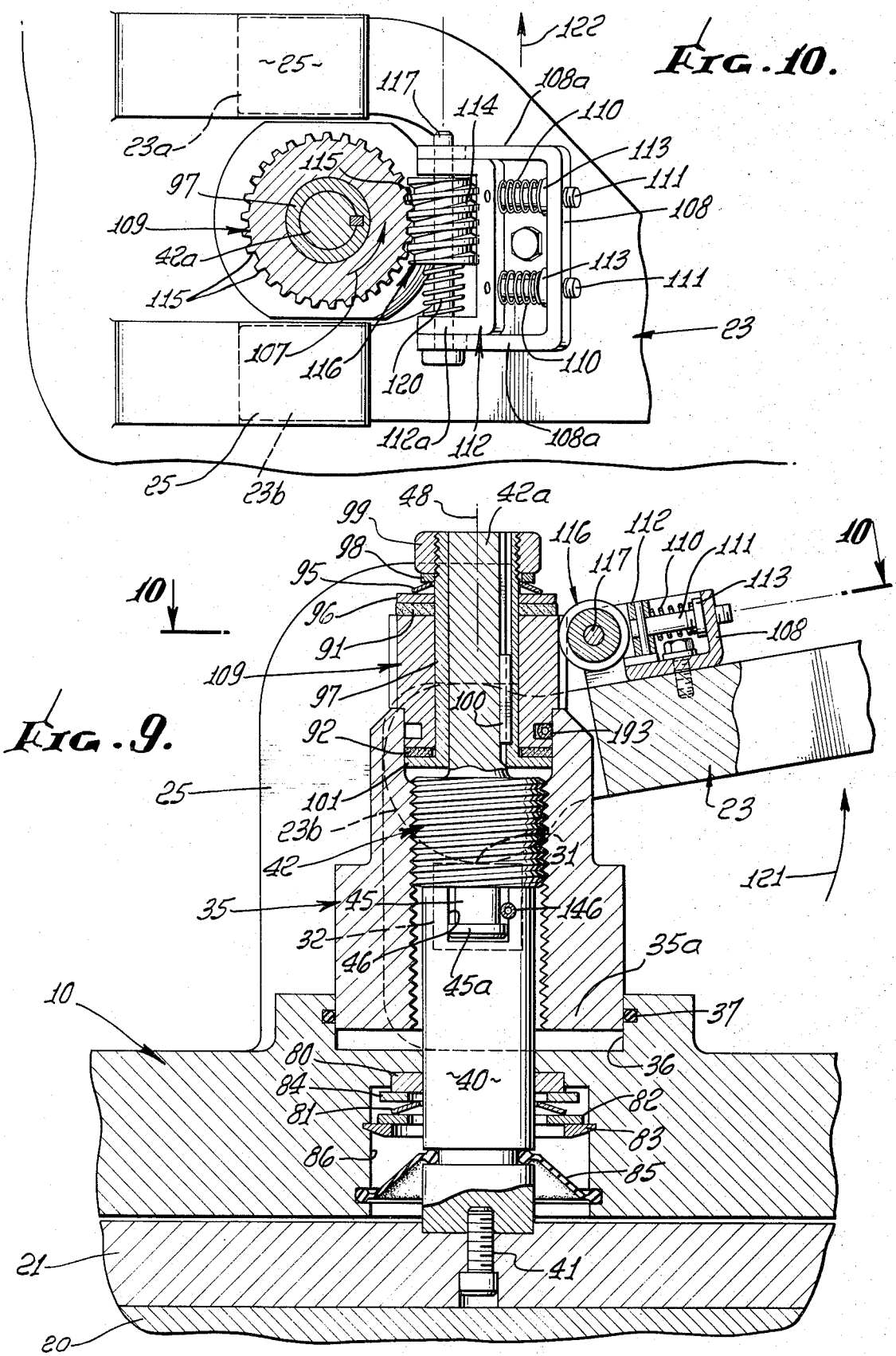

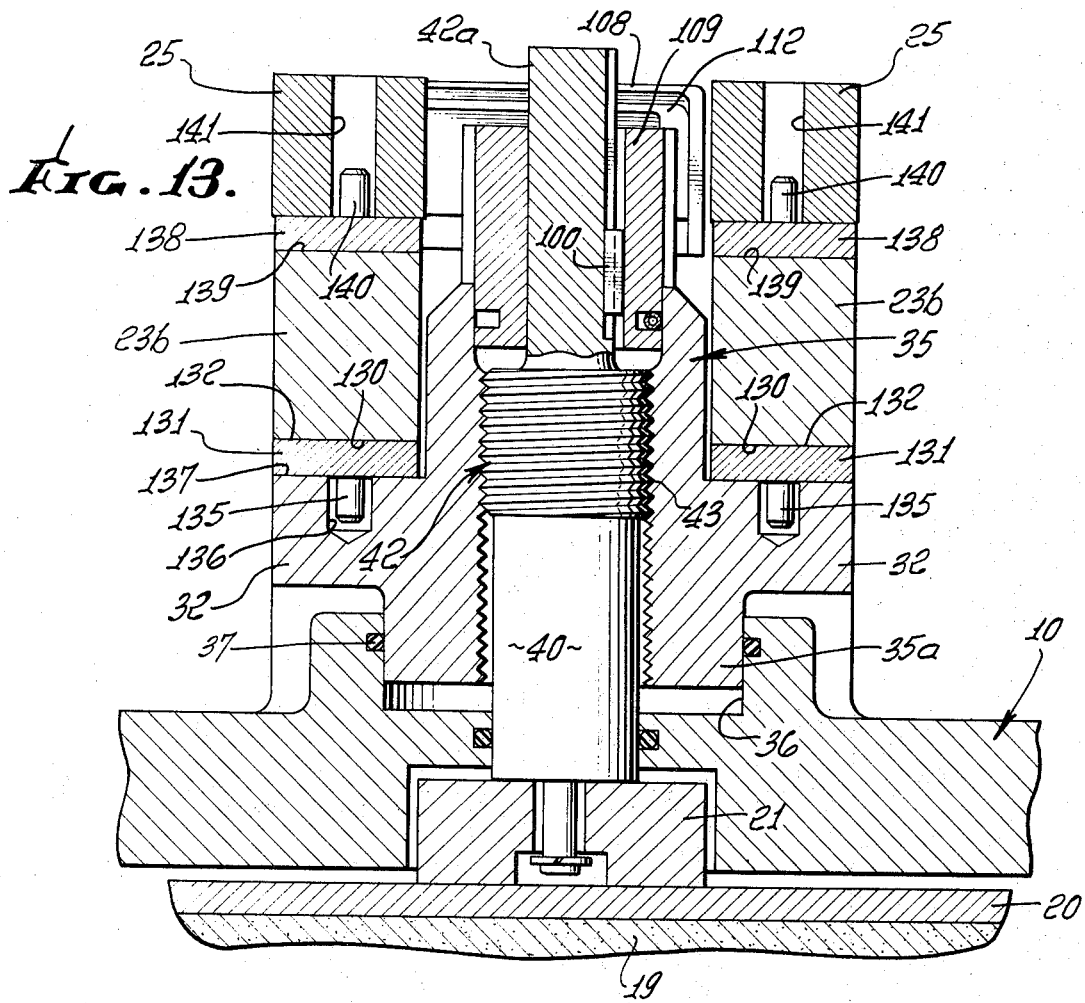
FIG. 13.
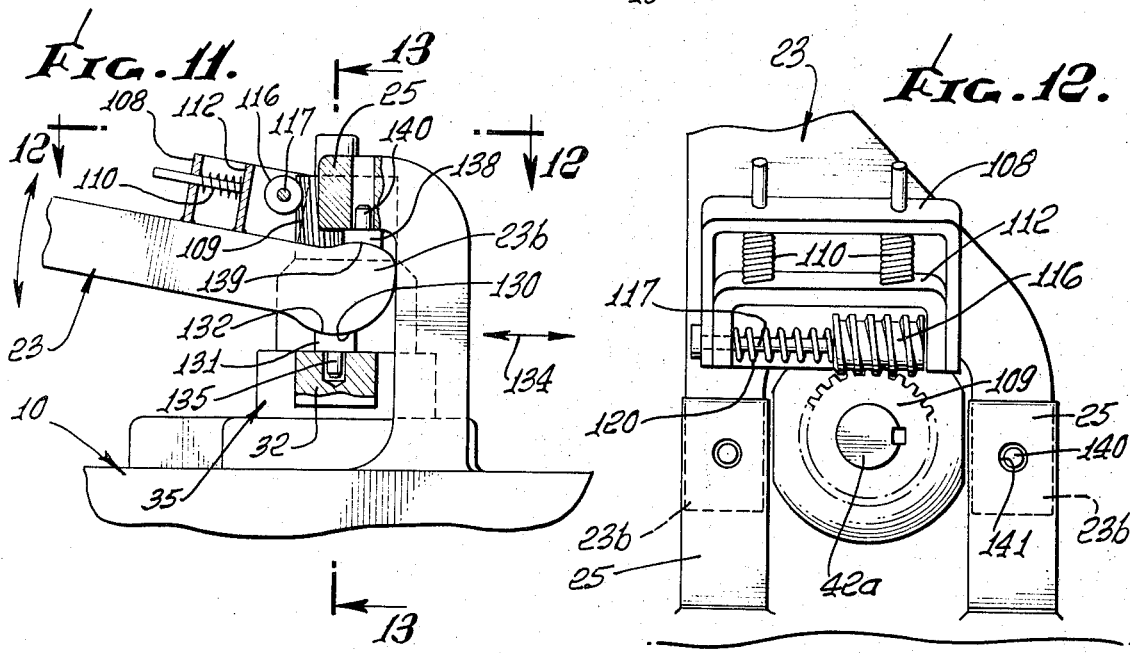
FIG. 11.
FIG. 12.

– 1 –

RATCHET ACTUATED BRAKE WEAR COMPENSATION

BACKGROUND OF THE INVENTION

This invention relates generally to friction braking apparatus, and more particularly concerns advances in the art of compensating for wear of brake linings or pads, as for example are used in disc brake systems, and especially as concerns the use and application of a lever to provide both braking force and wear compensating force or motion.

Many vehicle braking systems, particularly as employed on trucks and buses, use air pressure, as for example at 120 p.s.i., to displace the actuator piston for effecting braking. It has long been recognized that such systems present certain disadvantages. Among these are the relatively large size of the piston required to develop necessary braking force, the latter being a function of the product of the piston area and the air pressure. While principles of mechanical advantage may be employed to increase the braking force, the stroke of the large piston is undesirably increased when the brake lining wears, so that the required size of air actuated systems for vehicle disc braking presents serious space and cost problems. Further, compensation for brake wear presents an additional problem, which is aggravated by the large stroke requirements of pneumatic actuators.

Further, prior mechanisms to compensate for brake wear have lacked the concept of lever usage both for braking force application with high mechanical advantage and for wear compensating motion and in the unusually advantageously compact and simple manner to be described.

SUMMARY OF THE INVENTION

It is a major object of the invention to provide unusually effective solutions to the above referenced disadvantages and problems. The invention enables achievement of high mechanical advantage without increase in size of equipment, extreme simplicity and a high degree of safety and reliability, and enables usage of pneumatically actuated brakes of relatively small size for use on trucks and other vehicles.

Basically, apparatus incorporating the invention comprises a lever, and means responsive to lever swinging to receive primary force transmission via one portion of the lever for effecting advancement of a brake part into braking engagement with the moving part such as a disc, and to receive auxiliary force transmission from another portion of the lever to displace the brake part toward the disc in compensating relation to the degree of brake part wear, whereby the range of lever swinging may be quite limited. As will be seen, a plunger may be provided to be displaceable to move the brake part against the disc; an actuator may be movable endwise in response to lever swinging to so displace the plunger, the actuator including a body and a shaft having rotary threaded coupling to the body and also coupled to the plunger; means may be provided to rotate the shaft relative to the body and in a direction advancing the shaft relatively toward the plunger to compensate for increased wear of the brake part, and such means may include interengaged cam shoulders carried by the actuator and the lever to so rotate the shaft in response to lever swinging with accompanying auxiliary force transmission, as referred to.

Other objects include the provision of spring structure mounted on the lever to effect rotation of a rotary element such as a helical gear on the actuator which defines the referenced cam shoulder or shoulders in the actuator, and in the unusually advantageous manner as will be seen; The provision of positive and also releasable intercoupling of the rotary element and the shaft, in advantageous relation; the provision of ratchet structure engaging the helical gear to operate in conjunction with lever swinging as will be described; and the provision of unusually advantageous lever configurations.

These and other objects and advantages of the invention, as well as the details of an illustrated embodiment, will be more fully understood from the following description and drawings, in which:

DRAWING DESCRIPTION

FIG. 1 is an end elevation showing disc brake apparatus incorporating the invention;

FIG. 2 is a section taken in elevation on lines 2—2 of FIG. 1;

FIG. 3 is an enlarged section taken in elevation on lines 3—3 of FIG. 1;

FIG. 4 is an enlarged section taken on lines 4—4 of FIG. 3;

FIG. 5 is a section on lines 5—5 of FIG. 3;

FIGS. 6a, 6b and 6c are enlarged fragmentary views;

FIG. 9 is a view like FIG. 3 showing yet another form of the invention;

FIG. 10 is a horizontal section on line 10—10 of FIG. 9;

FIG. 11 is an elevation view of still another form of the invention;

FIG. 12 is a plan view on lines 12—12 of FIG. 11;

FIG. 13 is an enlarged vertical elevation on lines 13—13 of FIG. 11; and

FIG. 14 is a schematic showing of a basic form of the invention.

DETAILED DESCRIPTION

Figure 7:
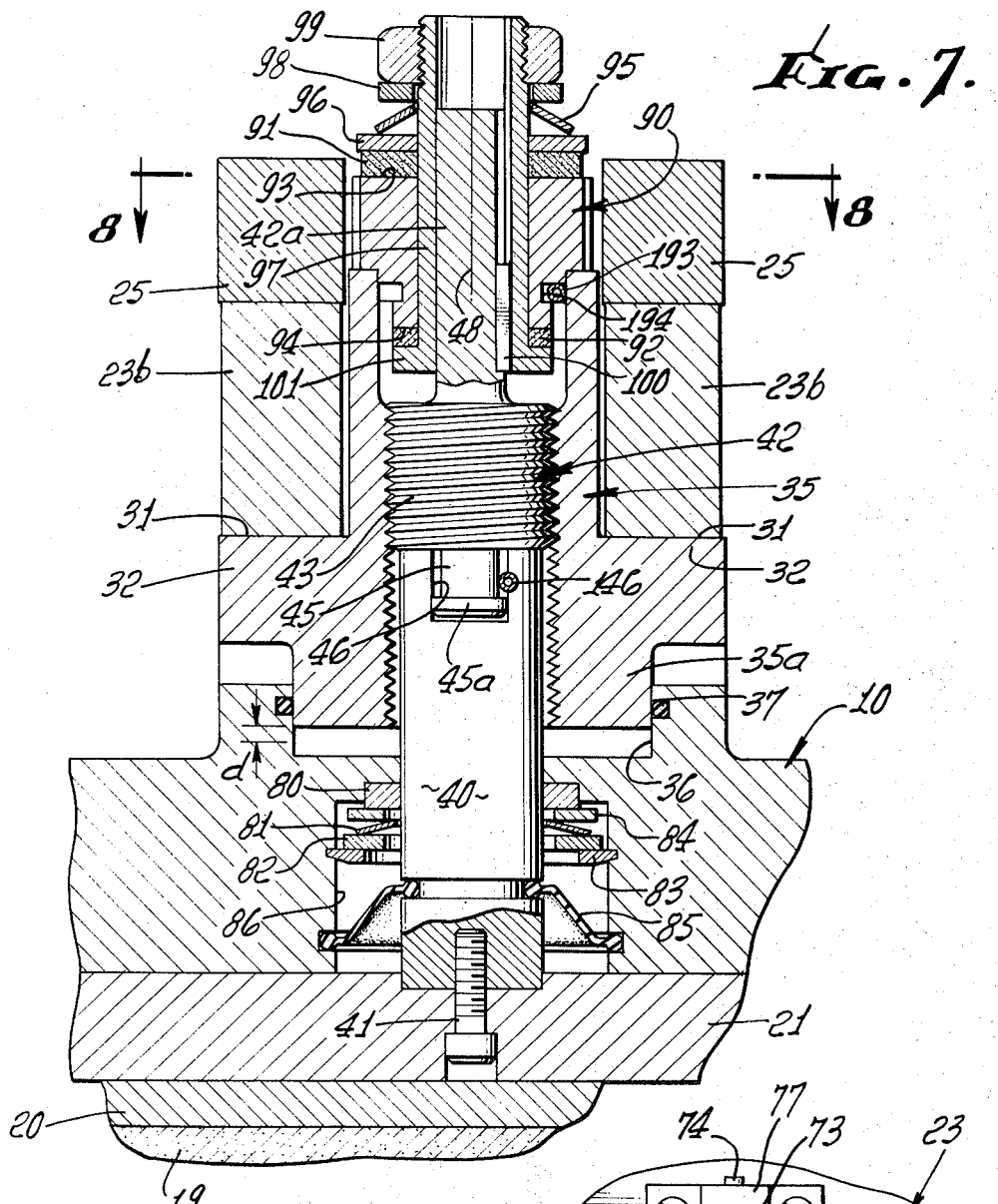
FIG. 7 is a view like FIG. 3 showing another form of the invention.

In the drawings, a caliper 10 straddles a moving part such as disc 11 rotatable about an axis 12. The disc may have an integral hub 12a suitably attached as at 13 to rotating wheel or axle structure 14, and it is intended that the disc be braked in the manner to be described.

An arcuate braking part or pad 15 is carried by the caliper to face one side 11a of the disc, the pad being supported by a plate 16 the upper extension 16a of which slides on a pin 17 carried by the caliper. Caliper jaw 18 clamps against the plate during braking. Similarly, an arcuate braking part or pad 19 faces the opposite side 11b of the disc and is supported by a plate 20 the upper extension 20a of which slides on pin 17. Braking force is transmitted to plate 20 and pad 19 via an arcuate plate 21, which may be connected to plate 20.

In FIG. 2, braking force is typically applied by lever means, as for example lever 23, which pivots or rocks counterclockwise between the solid line position as shown and the broken line position 23a, thereby to urge anvil or actuator structure 24 leftwardly relative to the hook shaped member 25 which is integral with the caliper 10. Extending the description to FIGS. 1 and 3, the lever may with unusual advantage have yoke shape, with arms diverging toward each of two actuators 24 located for applying braking force in tandem, via plates 20 and 21 as described. Accordingly, a single prime mover, as for example pneumatic actuator 27, may be operated to displace a ram 28 to the left in FIG. 2. for rocking the lever and thereby displacing both actuators 24 toward the disc, and relative to the caliper 10. The ram 28 may have universal joint connection with the lever, as at ball joint 33; and the enlarged end portions 23b of each arm of the lever may fulcrum at 29 adjacent the inner concave surfaces 30 of members 25, and exert braking force at the points of engagement 31 with the anvil ears or lugs 32. The construction is such, that a very large mechanical advantage of force transmission is obtained with respect to braking force transmission from the actuator to the anvil structures. Actuator 27 may be suitably attached to the caliper, or the vehicle structure mounting the caliper.

Each actuator 24 may have the form shown in FIGS. 3 and 4, with a tubular body 35 projecting at 35a into a bore 36 formed in the caliper 10, for guiding movement of the actuator relative to the caliper. O-ring seal 37 seals off the clearance between body 35 and the bore 36 to block access of contaminants to structure internal to the body 35. The actuator is movable endwise, in the forward direction indicated by arrow 38, and in response to lever swinging in the advancement direction shown by arrow 39, to displace a plunger 40 that moves the brake part 19 against the moving part, i.e., disc 11 in the example. The plunger forward end may be connected to arcuate plate 21 as by fastener 41.

The actuator also includes a shaft, as for example is seen at 42, having rotary threaded coupling to the body 35 as afforded by shaft threads 43 engaged with body internal thread 44. The shaft is also coupled to the plunger 40 to axially move the latter as the shaft is rotated relative to body 35, the plunger being non-rotatable. The coupling, as seen at 144, may include a shaft forward extension 45 received in plunger bore 46, the extension head 45a retained in the bore as by a spring pin 146 to block retraction of the head while allowing it to rotate as the shaft rotates.

In accordance with an important aspect of the invention, means is provided to rotate the shaft relative to the body 35 and in a forward direction advancing the shaft relatively toward the plunger to compensate for increased wear of the brake lining or part 19, such shaft rotating means including interengaged cam shoulders carried by the actuator and lever to rotate the shaft in response to lever swinging. As a result, a foolproof, compact assembly is provided. In the FIG. 3 embodiment, a rotary element such as a helical gear 47 defines the aforementioned cam shoulders carried by the actuator, the shaft and rotary element having a common axis 48.

FIGS. 1 and 6a, 6b and 6c show typical development of the helical cam shoulders 49 on the gear 47. The cam shoulder on the lever is indicated at 50 as movable in an axial radial plane 51 from position 50a to position 50c as the lever moves in direction 38. Typically, the gear is rotated during lever swinging in the up-direction indicated by arrow 139 in FIG. 3, i.e., after release of braking force transmission through threaded shaft 42. Successive cam or gear shoulders 49 are engaged by the cam shoulder 50 on the lever as the brake part or lining 19 wears, due to continued rotary advancement of the gear 47, as for example in the directions 52 and 53 in FIG. 1.

With further reference to FIG. 3, ratchet structure is provided to engage the gear 47 to allow relatively forward rotation thereof in one direction (i,e., the advancement directions 52 and 53 in FIG. 1) as the lever swings in retraction direction 139, and to block reverse rotation of the gear as the lever swings back to broken line position 23a in FIG. 2. Such ratchet structure may for example include a yieldably biased arm such as spring arm 56 integral with bracket 57, and having tangs 56a successively engaging each of a series of circularly spaced radial shoulders 58 on the upper end face of gear 47, as better seen in FIG. 5. Bracket 57 may be attached at 59 to body 35. FIGS. 3 and 4 show another form of such ratchet structure to comprise circularly spaced shoulders 60 presented at the side of gear 47 and successively engaged by a latch dog 61. The latter is yieldably biased toward the gear as by tension springs 62 and 63, as shown, the springs carried by a clip 64 attached to body 35. Note that notches 66 in the gear periphery are sized to receive the projection at the inner side of the latch dog, the latter having a cam shoulder 67 engaged by successive shoulders 68 on the gear to displace it from the notches as the gear rotates.

In that form of the invention seen in FIG. 3, the gear 47 and shaft 43 have positive intercoupling, as for example is afforded by a key 70 fitting an axial keyway 71 in an upper stem extension 42a of the shaft, and an axial keyway 72 in the bore of the annular gear 47.

A further aspect of the invention concerns the provision of spring structure on the lever continually urging the cam shoulder on the lever toward the rotary element, i.e., gear 47. As seen in FIGS. 1 and 3, such spring structure includes a first spring 73 extending about a plunger 74, a forward extension 74a of which defines the cam shoulder 50 previously referred to. One end of the spring seats against a washer 76 supported by a bracket 77 mounted on the lever to swing therewith, while the opposite end of the spring pushed leftwardly against a flange 78 on the plunger 74. The spring may be compressed as the lever moves down, in direction 39 in FIG. 3, and may release energy as the lever moves up, accompanied by rotation of gear 47. Accordingly, the motion of lever swinging is utilized for purposes of compensating for wear of the brake lining, and in a simple, effective and compact manner.

Further as seen in FIG. 3, a drag part or ring 80 is operatively carried by the plunger or stem 40 to frictionally resist displacement therealong, and a Belleville spring 81 retained on the caliper by retainer rings 82–84 yieldably resists drag ring displacement with the plunger in the advancement direction 38. As the brake pad 19 continues to wear, such frictional resistance is overcome by plunger displacement compensating for brake wear. Belleville spring 81 retracts the plunger 40, brake pad 19 and actuator 35, as by stroke distance "*d*", upon each release of brake force transmission via the lever 23. A dust seal 85 seals off between the plunger and the caliper bore 86, as shown, preventing access of dust and grime to elements 80-84 as described. Spring pin 185 carried by body 35 interfits annular groove 186 in gear 47 to retain the latter to the body while allowing it to rotate.

Figure 8:
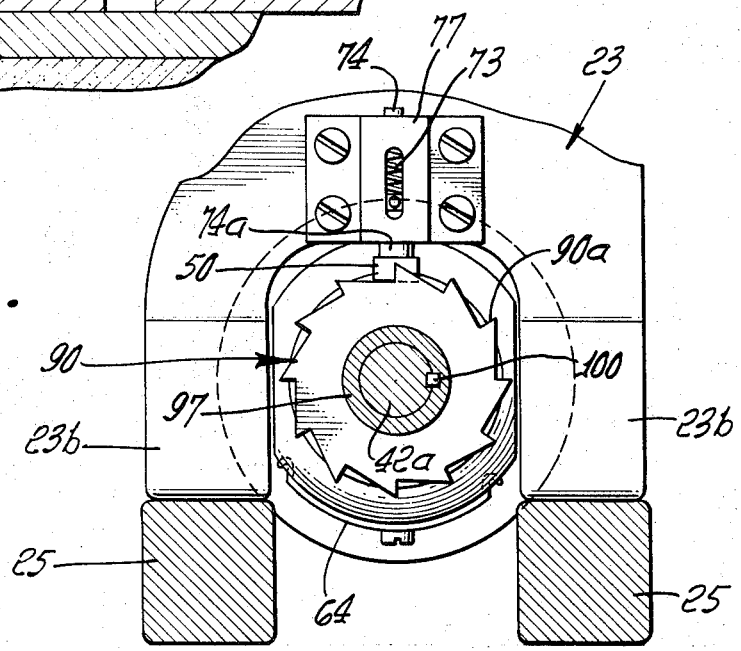
FIG. 8 is a horizontal section on line 8—8 of FIG. 7.

The modification seen in FIGS. 7 and 8 is similar to the FIG. 3 form of the invention, corresponding parts bearing the same numerals. The rotary element (such as helical gear 90) and the shaft extension 42a have releasable intercoupling characterized as operable to allow swinging of the lever in its advancement direction despite inadvertent blockage of rotation of the shaft 42 for any reason. Accordingly, such releasable intercoupling provides an added safety feature whereby operation of the brake is assured.

The releasable intercoupling comprises at least one friction washer, examples of which include washers 91 and 92 extending about the shaft extension 42a and adapted to frictionally clamp axially facing end shoulders 93 and 94 on the element or gear 90. Clamping force is produced by a Belleville spring 95 seated on a washer 96 supported by washer 91, the spring urging a sleeve 97 upwardly via a washer and nut 98 and 99 on the upper end of the sleeve. The latter is keyed at 100 to the shaft extension 42a, and the friction washer 92 is clamped between a boss 101 on the sleeve lower end and the lower end shoulder 94 of the gear. In operation, if sufficient resistance to turning of the shaft 42 relative to body 35 develops for any reason, acting to impede brake actuating down stroking of swinging of the lever 23, the gear 90 being turned by the lever about axis 48 will rotate relative to the shaft and sleeve 97, as afforded by slippage of the clutch defined by the friction washer or washers 91 and 92; however, ordinarily the shaft 42 will be rotated relative to the body 35 in response to lever upswinging and release of spring energy, as described, the sleeve and shaft being turned by gear 90. The helical cam shoulders on the latch are seen at 90a in FIG. 8, and correspond to shoulders 49 in FIGS. 1 and 6. Spring pin 193 carried by body 35 interfits an annular groove 194 in gear 90 to retain the latter to the body while allowing it to rotate.

The modification seen in FIGS. 9 and 10 is similar to the FIGS. 7 and 8 form of the invention, corresponding parts bearing the same numerals. As before, spring structure urges a cam shoulder on the lever toward the rotary element such as helical gear 109. Such spring structure includes first springs 110 extending about parallel plungers 111 on which a yoke 112 is slidable. The rightward ends of the springs seat against washers 113 supported by a bracket 108 mounted on the lever 23 to swing therewith. The leftward ends of the springs urge the yoke 112 leftwardly to maintain interengagement of the cam shoulders 114 (carried on the lever) with the cam shoulders 115 on the rotary element or gear 109. The cam shoulders 114 may with unusual advantage be defined by a helical pinion gear 116 carried in a shaft 117 supported by yoke 112, and so that the pinion may rotate about the shaft as the lever is advanced downwardly to effect braking. In addition, the pinion energizes a second spring 120 by bodily moving toward the latter on the shaft 117 as the lever moves downwardly, a ratchet as previously described preventing rotation of the gear 109 in a direction opposite to that indicated at 107. That spring is carried in the shaft 117 and confined between yoke arm 112a and the pinion. Note that the yoke is movable relative to the bracket 108, suitable slots in the bracket arms 108a guiding the ends of shaft 117.

As the lever arm is retracted or lifted in the direction 121, the helical gear 90 is retracted with the body 35, the second spring 120 expands and displaces the pinion in the direction 122, thereby to rotate the gear 109 in the direction 107, for effecting advancement of the shaft 42 and plunger toward the moving brake part to compensate the brake pad 19 for wear. Note that spring 120 also functions to allow downward swinging of the lever, for assurance of positive braking, despite any inadvertent jamming of the helical gear that would prevent its rotation, it being the return stroke (rather than the advancement stroke) of the lever during which the gear 109 is rotated.

In the modification seen in FIGS. 11-13, the end portion 23b of each arm of the lever 23 has a convexly curved cam surface 130 through which force is transmitted to the actuator 35. In addition, a seat 131 has a correspondingly concavely curved seating surface 132 to interfit the lever cam surface for distributing such force over the mating area of the seat, whereby wear of such curved surfaces is substantially reduced. Note that seat 131 is shiftable in lateral directions indicated by arrows 134 and relative to the actuator and within a predetermined range in response to lever pivoting, to accommodate slight lateral shifting of the lever end portion during pivoting. For that purpose, the seat may carry a pin 135 loosely received in a groove 136 in the actuator lug 32 against which the seat slidably bears at 137.

A second seat 138 may be provided at the opposite side of the lever end portion to interfit its curved surface 139, in a similar manner, that seat too having a pin 140 slidable laterally in a groove 141 in the hook shaped member 25.

The remaining structure as seen in FIGS. 11-13 is like that of FIGS. 9 and 10, excepting that elements 80-86 are not included. Reliance is placed on the secondary spring 120 to expand and shift the pinion 116 axially on shaft 117 for rotating the helical gear only enough to make up for lining wear, but not quite enough to urge the shaft, plunger and brake lining into forceful frictional engagement with the rotating disc, when the lever is retracted or swung upwardly after braking. No friction clutch is provided.

FIG. 14 summarizes a basic form or principle of the invention. It depicts a lever 200 swingable as indicated by arrows 201 and 202, and means (generally indicated at 203) responsive to such swinging to receive primary force transmission (as at 204) via one portion of the lever for effecting advancement of a brake part 205 into braking engagement with a moving part (such as a rotary disc 206, for example), and to receive auxiliary force transmission (as at 207) via another portion of the lever to displace the brake part 205 toward the disc in wear compensating relation to the degree of brake part wear. As illustrated, the curved end portion of the lever transmits force 204, and another portion of the lever transmits force 207, as is also clear from the description of the embodiments of FIGS. 1-13. The lever 200 is shown as fulchrumed at 209.

I claim:

1. For use in a brake assembly operable to advance a brake part into braking engagement with a moving part, and operable to compensate for brake part wear, the combination comprising
   a. a plunger displaceable to move the brake part against said moving part, b. a lever adapted to be swung in advancement and retraction directions, c. an actuator movable endwise in response to lever swinging in said advancement direction to so displace the plunger, the actuator including a body and a shaft having rotary threaded coupling to the body and also coupled to said plunger, d. means to rotate the shaft relative to the body and in a direction advancing the shaft relatively toward the plunger to compensate for increased wear of the brake part, said means including a rotary element extending in substantially coaxial relation with the shaft, e. said means including interengaged cam shoulders carried by the rotary element and lever to so rotate the shaft in response to said swinging of the lever, said cam shoulder carried by the lever to swing bodily therewith while remaining in engagement with a cam shoulder on the rotary element and also to move relative to the lever in response to lever swinging there being a spring structure relatively urging the cam shoulder on the lever into engagement with a cam shoulder on the rotary element.

2. The combination of claim 1 wherein said spring structure includes first and second springs respectively urging the cam shoulder on the lever in a first direction generally toward said axis and in a second direction generally normal to said first direction whereby the lever remains swingable in said advancement direction despite inadvertent blockage of rotation of the rotary element.

3. The combination of claim 1 wherein said rotary element defines multiple helical cam shoulders successively engageable by the cam shoulder on the lever as the brake part wears, the lever having a bifurcated end portion straddling said actuator body and engageable with lug surfaces thereon at opposite sides of said shaft.

4. The combination of claim 3 wherein said rotary element and shaft have positive intercoupling.

5. The combination of claim 3 including ratchet structure engaging the rotary element to allow relatively forward rotation thereof in one direction as the lever swings in one direction and to block reverse rotation of the gear as the lever is swung in an opposite direction.

6. The combination of claim 5 wherein the rotary element has circularly spaced shoulders on one axially end face thereof successively engageable by a yieldably biased arm defined by the ratchet structure.

7. The combination of claim 5 wherein the rotary element has circularly spaced shoulders presented at the side thereof and successively engageable by a yieldably biased latch dog defined by the ratchet structure.

8. The combination of claim 1 wherein said rotary element and shaft have releasable intercoupling characterized as operable to allow swinging of the lever in said advancement direction despite inadvertent blockage of rotation of the shaft.

9. The combination of claim 8 wherein said releasable intercoupling comprises a friction washer extending about the shaft, the rotary element being movable axially relative to the shaft and there being a spring urging the rotary element in a direction to clamp the friction washer against an axially facing shoulder on the rotary element.

10. The combination of claim 1 including a caliper mounting said actuator to move relative thereto toward and away from said moving part in the form of a disc straddled by the caliper.

11. The combination of claim 10 including a second actuator and associated plunger and means to rotate the second actuator shaft, as defined, the lever being in the form of a yoke having opposite end portions each of which straddles one of the actuators.

12. The combination of claim 10 including a grip ring frictionally gripping the plunger to advance therewith and a Belleville spring carried by the caliper to yieldably resist advancement of the grip ring to an extent such that the plunger advances relative to the grip ring overcoming frictional resistance of said ring to compensate for brake part wear.

13. The combination of claim 1 wherein the lever has a curved cam surface through which force is transmitted to the actuator, there being a correspondingly curved seat carried by the actuator to interfit the lever cam surface for distributing said force over said seat.

14. The combination of claim 13 wherein the seat is carried by the actuator to be shiftable relative thereto within a predetermined range, and in response to lever pivoting.

* * * * *